US012000347B2

(12) United States Patent
Keber et al.

(10) Patent No.: US 12,000,347 B2
(45) Date of Patent: Jun. 4, 2024

(54) INTAKE AIR GUIDE WITH INTAKE AIR PRESSURE ASCERTAINMENT AND METHOD FOR INTAKE AIR PRESSURE ASCERTAINMENT

(71) Applicant: Bayerische Motoren Werke Aktiengesellschaft, Munich (DE)

(72) Inventors: Andreas Keber, Steyr (AT); David Leitner, Weistrach (AT); Martin Ranzmaier, Wilhering (AT); Paul-Andre Rosenberger, Schleissheim/Wels (AT); Josef Wasserbauer, Steyr (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 7 days.

(21) Appl. No.: 17/793,683

(22) PCT Filed: Feb. 11, 2021

(86) PCT No.: PCT/EP2021/053299

§ 371 (c)(1),
(2) Date: Jul. 19, 2022

(87) PCT Pub. No.: WO2021/180412

PCT Pub. Date: Sep. 16, 2021

(65) Prior Publication Data

US 2023/0064491 A1 Mar. 2, 2023

(30) Foreign Application Priority Data

Mar. 10, 2020 (DE) ..................... 10 2020 106 531.0

(51) Int. Cl.
*F02D 41/00* (2006.01)
*F02D 41/24* (2006.01)

(52) U.S. Cl.
CPC ..... *F02D 41/0007* (2013.01); *F02D 41/2451* (2013.01); *F02D 2200/0402* (2013.01); *F02D 2200/0408* (2013.01)

(58) Field of Classification Search
CPC ............. F02D 41/0007; F02D 41/2451; F02D 2200/0402; F02D 2200/0408
See application file for complete search history.

(56) References Cited

U.S. PATENT DOCUMENTS 9,605,608 B2 * 3/2017 Yokono ............... F02D 41/2464
2009/0314082 A1 * 12/2009 Sujan ...................... F01D 17/06 73/497

(Continued)

FOREIGN PATENT DOCUMENTS

CN 104963780 A 10/2015
DE 101 58 262 A1 6/2003

(Continued)

OTHER PUBLICATIONS

Machine generated translation of the description of DE102015224828A1 (obtained May 19, 2023).*

(Continued)

*Primary Examiner* — Ngoc T Nguyen
(74) *Attorney, Agent, or Firm* — Crowell & Moring LLP

(57) ABSTRACT

An operating method for a fresh-air feed device for an internal combustion engine is configured for feeding fresh air from the environment surrounding the internal combustion engine into at least one combustion chamber of the internal combustion engine. A controllable throttle valve is configured for varying a through-flowable area of the fresh-air feed device and for at least partially shutting off the fresh-air feed device. The device has a compressor which is arranged upstream of the throttle valve in an intended (Continued)

through-flow direction from the environment into the combustion chamber, which is configured for conveying an air mass flow in the intended through-flow direction in the fresh-air feed device. A pre-compressor section of the device is arranged upstream of the compressor, an intermediate section is arranged downstream of the compressor device and upstream of the throttle valve, and a post-throttle section is arranged downstream of the throttle valve. A first air pressure sensor is arranged in the pre-compressor section, and a second air pressure sensor is arranged in the post-throttle section. In a first operating state, a first air pressure is measured via the first air pressure sensor. In a second step in the first operating state, a second air pressure is measured via the second air pressure sensor. Based on the second air pressure, a theoretical air pressure for the intermediate section is ascertained in a manner dependent on a theoretically through-flowable area set by the throttle valve. The theoretical air pressure is compared with the first air pressure or with a comparison value for the first air pressure. In the event of a deviation of the theoretical air pressure from the first air pressure or from the comparison value beyond an error threshold value, a corrective value for the ascertainment of the theoretical air pressure is determined.

4 Claims, 2 Drawing Sheets

(56) References Cited

U.S. PATENT DOCUMENTS

| | | | | |
|---|---|---|---|---|
| 2012/0109494 | A1 | 5/2012 | Jeschke | |
| 2015/0240731 | A1 | 8/2015 | Yokono et al. | |
| 2015/0377156 | A1* | 12/2015 | Hagari | F02D 11/106 60/602 |
| 2016/0377004 | A1* | 12/2016 | Yokono | F02D 41/18 701/103 |
| 2017/0074180 | A1 | 3/2017 | Hellstrom et al. | |

FOREIGN PATENT DOCUMENTS

| | | | |
|---|---|---|---|
| DE | 10 2007 000 300 | A1 | 12/2007 |
| DE | 10 2008 020 477 | A1 | 10/2009 |
| DE | 10 2013 207 373 | A1 | 10/2014 |
| DE | 10 2014 213 631 | A1 | 8/2015 |
| DE | 10 2015 224 828 | A1 | 12/2016 |
| DE | 10 2016 117 139 | A1 | 3/2017 |
| EP | 1 793 106 | A1 | 6/2007 |
| EP | 2 447 516 | A1 | 5/2012 |
| JP | 2012-57582 | A | 3/2012 |

OTHER PUBLICATIONS

International Search Report (PCT/ISA/210) issued in PCT Application No. PCT/EP2021/053299 dated May 31, 2021 with English translation (six (6) pages).

German-language Written Opinion (PCT/ISA/237) issued in PCT Application No. PCT/EP2021/053299 dated May 31, 2021 (six (6) pages).

German-language Search Report issued in German Application No. 10 2020 106 531.0 dated Apr. 9, 2020 with partial English translation (11 pages).

Chinese-language Chinese Office Action issued in Chinese Application No. 202180007538.3 dated Nov. 20, 2023, with English translation (16 pages).

* cited by examiner

INTAKE AIR GUIDE WITH INTAKE AIR PRESSURE ASCERTAINMENT AND METHOD FOR INTAKE AIR PRESSURE ASCERTAINMENT

BACKGROUND AND SUMMARY

The invention relates to an intake air guide for an internal combustion engine, wherein a sensor-free intake air pressure ascertainment takes place in at least one section of this intake air guide, and to a method for intake air pressure ascertainment.

DE 10 2016 117 139 A1 relates to a method and system for pump regulation, wherein this also relates to a pressure in the intake manifold of an internal combustion engine.

The invention is described hereinafter in conjunction with a specific internal combustion engine, this is not to be understood as a restriction of the invention to this application. An internal combustion engine operable using diesel fuel, a so-called diesel engine, generally has a throttle flap in the fresh air line. The fresh air line is to be understood as a line which is used to feed fresh air from an environment surrounding the internal combustion engine to at least one combustion chamber of this internal combustion engine. In the planned flow direction through this fresh air line (from the environment into the combustion chamber), after the throttle valve, thus a device arranged in the fresh air line which is configured to preferably completely or partially block the fresh air line, a pressure sensor is arranged, which measures the air pressure in this section of the fresh air line. The air pressure in the fresh air line before the throttle flap is also significant for the control of the internal combustion engine. To save costs, this is not measured using a sensor, but rather can be ascertained on the basis of the controlled position of the throttle flap and the measured air pressure after the throttle flap. The following variables can be considered for the ascertainment: air pressure after the throttle point (measured), temperature before the throttle point (measured), the air mass flow (measured), and the effective area (area in the region of the throttle flap through which flow can occur, depends on the degree of opening of the throttle flap). If individual ones or all of these parameters are known, the ascertainment is possible with sufficient accuracy.

Experiments have shown that this ascertainment can be erroneous in specific constellations, this can result in efficiency losses in the control of the internal combustion engine. In particular, deposits can accumulate on the throttle flap in operation of the internal combustion engine, so that the actual area through which flow can occur at the throttle flap deviates from the above-mentioned effective area, or the area presumed solely on the basis of a degree of opening of the throttle flap, this results in an incorrect ascertainment of the air pressure before the throttle flap. Furthermore, the throttle flap and the fresh air line are subject to manufacturing tolerances, which can also have an effect on the actual area through which flow can occur at the throttle flap and can also result in an incorrect ascertainment of the air pressure before the throttle flap.

It is an object of the invention to provide a method for air pressure ascertainment before the throttle flap and a fresh air feed which is controlled according to this method. This object is achieved by a method and device in accordance with the independent claims. Preferred refinements of the invention are the subject matter of the dependent claims.

An operating method for a fresh air feed device is proposed. In the meaning of the invention, a fresh air feed device is to be understood as a device for feeding fresh air from an environment surrounding the internal combustion engine into at least one combustion chamber or combustion space of the internal combustion engine. The fresh air feed device is thus to be understood as a device for guiding an air mass flow to at least one combustion chamber, wherein this mass flow flows out of the environment into the combustion chamber through the fresh air feed device in a planned flow-through direction. Such a fresh air feed device accordingly has pipelines and further devices for guiding the fresh air.

One such further device in the fresh air feed device is a controllable throttle valve. In the meaning of the invention, such a throttle valve is to be understood as a device for controlling or at least influencing the air mass flow in the fresh air feed device. Preferably, an area through which this air mass flow can flow in the fresh air feed device is changeable using the throttle valve. The size of this area is in particular indirectly determined or derived from a degree of opening of the throttle valve. In particular if the throttle valve has a throttle flap, a degree of opening of the throttle valve is describable by means of an opening angle of the throttle flap and furthermore a specific area through which flow can occur is assignable to each opening angle. In this context, the indirectly ascertained area at the throttle valve is referred to as the effective area. This effective area can also be understood colloquially as the presumed area, since it is only determined indirectly as described.

A further device in the fresh air feed device is a compressor device. Such a compressor device is preferably to be understood as a pump device. The compressor device is preferably designed as a compressor of a so-called turbocharger, and preferably as a compressor of an exhaust gas turbocharger. The compressor device is accordingly at least at times configured for conveying fresh air from the environment surrounding the internal combustion engine into the at least one combustion chamber and furthermore the compressor device is preferably configured for generating the air mass flow. With respect to the planned flow-through direction, this compressor device is arranged upstream of this throttle valve. In particular, the fresh air feed device is divided into three parts by the throttle valve and the compressor device, which are both arranged in the fresh air feed device, into a pre-compressor section upstream of the compressor device, an intermediate section downstream of the compressor device and upstream of the throttle valve, and a post-throttle section downstream of the throttle valve.

The pressure conditions in the fresh air feed are significant for the control of the fresh air feed and thus for the operation of an internal combustion engine. Due to the compressor effect at the compressor device and due to the throttle effect at the throttle valve, different pressures can result in specific operating points for the three mentioned sections of the fresh air feed device.

The operating method proposes a variant for ascertaining or determining the air pressures in all three sections of the fresh air feed device using only two measuring points for the air pressure. A first air pressure sensor is arranged in the pre-compressor section, which is configured to ascertain and preferably to measure the air pressure in the air mass flow in this section, the so-called first air pressure. A second air pressure sensor is arranged in the post-throttle section, which is configured to ascertain and preferably to measure the air pressure in the air mass flow in this section. The intermediate section is preferably formed free of air pressure sensors, in this section of the fresh air feed device, an air pressure sensor is arranged in particular or the proposed method is used in the event of failure or if an air pressure sensor arranged there is not operated.

The proposed operating method provides the following method steps, which can also be executed in a sequence other than that indicated. In a first operating state of the fresh air feed device, a first air pressure is measured using the first air pressure sensor. This first air pressure can preferably be converted into a comparison value. A conversion can take place in particular if it is known that the air pressure in this first operating state is a different one in the intermediate section than this measured first air pressure, wherein the first operating state is selected in such a way that the relationship between the first air pressure and the air pressure in the intermediate section is known in this operating mode. Preferably, in this first operating state, the internal combustion engine which is supplied with fresh air using the fresh air feed device is in an idle state or more preferably this first operating state is a state of which it is known that the air pressure in the pre-compressor section corresponds to the air pressure in the intermediate section. In particular, such a state is ascertainable by means of studies or calculations or is predeterminable on the basis of experiences.

And in a further step, in the same way as in this above-mentioned first operating state, a second air pressure is measured using the second air pressure sensor. The two air pressures can preferably be measured at the same point in time or preferably in the same operating state but at different points in time.

In a further step, a theoretical air pressure for the intermediate section is ascertained on the basis of this measured second air pressure, wherein this theoretical air pressure for the intermediate section is ascertained as a function of an area through which flow can occur, the so-called effective area, which is set using the throttle valve. Furthermore, further parameters are preferably entered in this calculation of the air pressure for the intermediate section, wherein the air pressure calculation as such is enabled from the prior art using known relationships.

This theoretical air pressure, thus the air pressure ascertained on the measurement using the second air pressure sensor and as a function of the effective area, is compared to the first air pressure, thus the air pressure measured in the pre-compressor section for the same operating state. In particular under ideal conditions, thus when the effective area exactly corresponds to the actual area through which flow can occur, the first air pressure and the theoretical air pressure then correspond or the theoretical air pressure deviates by a predetermined threshold value from this first air pressure. The predetermined threshold value preferably takes into consideration an air pressure difference which results according to plan in the first operating state between the pre-compressor section and the intermediate section.

If this comparison of the theoretical air pressure to the first air pressure results in an unplanned deviation, the deviation is thus in particular outside a pre-determinable air pressure tolerance range, a correction value for the ascertainment of the theoretical air pressure is thus determined from the comparison. In particular, the effective area of the throttle valve is adapted in the calculation. With the aid of this procedure, the ascertainment of the air pressure for the intermediate section is thus calibrated, since the first operating state is selected in such a way that the air pressure in the intermediate region can be accurately concluded from the first air pressure or because the first operating state is selected so that the first air pressure corresponds to the air pressure in the intermediate region. Wherein in this context, air pressure relates to the air pressure in the air mass flow and not to static conditions. In operating states deviating from the first operating state, the air pressure in the air mass flow in the intermediate region can then be accurately ascertained on the basis of the calibrated calculation.

In one preferred embodiment, the fresh air feed device has at least one second operating state, which differs from the first operating state, and an internal combustion engine is operable by means of the fresh air feed device in a part-load or full-load operation in this second operating state. A corrected air pressure for the intermediate region is preferably ascertained in this second operating state of the fresh air feed device, wherein this corrected air pressure is preferably based on a second air pressure measured in this second operating state (measurement using the second air pressure sensor) using the correction value ascertained in the first operating state. Preferably, the air pressure in this post-throttle section is measured in the second operating state using the second air pressure sensor to ascertain the corrected air pressure. Furthermore, this correction value, which has been ascertained in the first operating state, is used for ascertaining the corrected air pressure. In particular, the effective area is corrected and the air pressure in the intermediate region is ascertained in the second operating state by means of this corrected effective area. In particular by way of such a method, in the second operating state, in which in particular the air pressure in the pre-compressor section does not correspond to the air pressure in the intermediate section, a more accurate determination of the air pressure present in the intermediate section is enabled on the basis of the air pressure ascertained in the post-throttle section and an improved control of the fresh air feed device is thus achievable.

Furthermore, the use of a fresh air feed device in an internal combustion engine is proposed. The fresh air feed device is configured for feeding fresh air from an environment surrounding the internal combustion engine into at least one combustion chamber of the internal combustion engine, and is designed as explained above. Accordingly, the fresh air feed device has the controllable throttle valve, which is configured to change an area through which flow can occur of the fresh air feed device. Furthermore, the fresh air feed device has the compressor device, which is arranged upstream from the throttle valve in the planned flow-through direction, thus from the environment into the combustion chamber. As described, this fresh air feed device is divided by means of the compressor device and by means of the throttle valve into three sections. In the fresh air feed device, the pre-compressor section is arranged upstream of the compressor device, the intermediate section is arranged downstream of the compressor device and upstream of the throttle valve, and the post-throttle section is arranged downstream of the throttle valve.

Furthermore, a first air pressure sensor is arranged in the pre-compressor section and a second air pressure sensor is arranged in the post-throttle section. Preferably, no air pressure sensor is arranged in the intermediate section and the intermediate section is preferably accordingly made air pressure sensor-free. Furthermore, the fresh air feed device is controlled at least at times according to a method according to one of the above-described embodiments, at least at times. In particular by way of a fresh air feed device of the mentioned construction, which is operated using the proposed method, it is made possible to ascertain the pressure in three different regions of the fresh air feed, wherein this is only measurable in two of these three regions and is determined in the third region from one of the other two air pressures. Furthermore, this results in the advantage of accurate air pressure ascertainment using less required hardware.

Furthermore, an internal combustion engine is proposed having one or more combustion chambers, wherein this at least one combustion chamber can be supplied with fresh air from the environment surrounding the internal combustion engine using a fresh air feed of the above-mentioned construction and wherein the above-explained operating method is executable using the fresh air feed. Furthermore, this operating method for operating the fresh air feed is stored in the form of computer-executable instructions on an electronic engine control unit, and furthermore the fresh air feed and thus also the internal combustion engine are preferably controlled, at least at times, using this method.

Individual features and embodiments of the invention are explained in more detail hereinafter on the basis of the figure, wherein combinations of the features of the invention other than those shown are also possible.

DETAILED DESCRIPTION OF THE DRAWINGS

Figure 1:
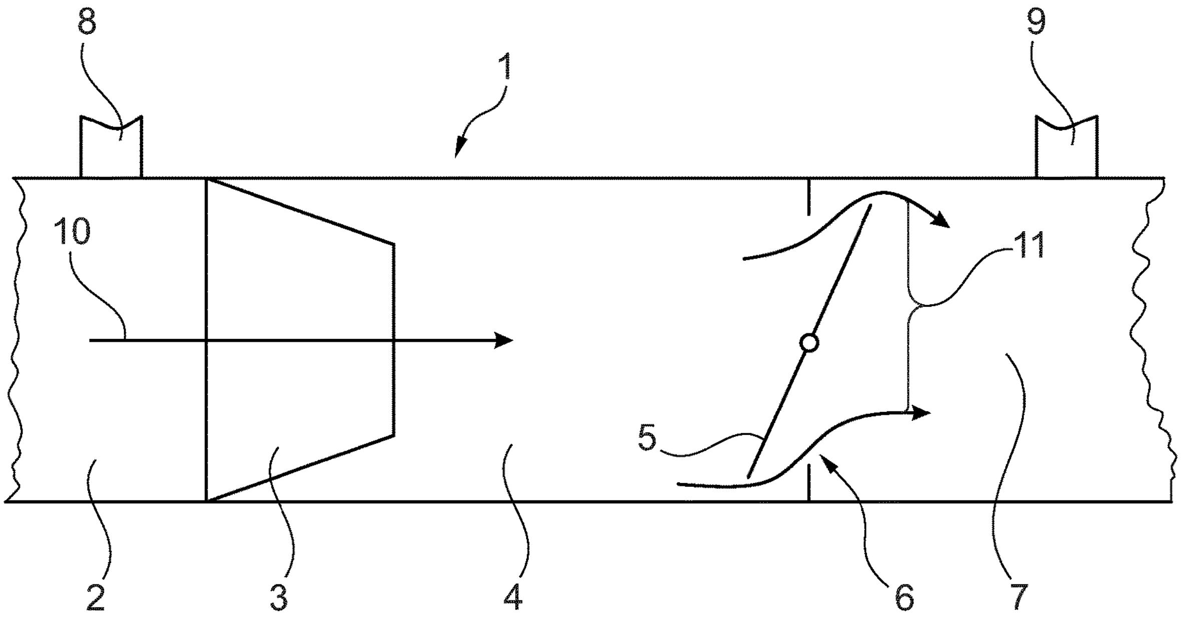
FIG. 1 shows a part of a schematic fresh air feed device.

Referring to FIG. 1, the fresh air feed device 1 is divided by the compressor device 3 and the throttle valve 6 having the throttle flap 5 into three subsections. The pre-compressor section 2 is located, with respect to the planned flow-through direction 10 through the fresh air feed device 1, thus with respect to an air mass flow from the environment into at least one combustion chamber of an internal combustion engine, before the compressor device 3, which is designed in the present step as the high-pressure stage of an exhaust gas turbocharger. Furthermore, the intermediate section 4 is arranged downstream of the compressor device 3 and upstream of the throttle valve 6 with respect to this planned flow-through direction 10. Furthermore, the post-throttle section 7 is arranged downstream of the throttle valve 6.

A first air pressure sensor 8, using which the air pressure in the air mass flow in this section is measurable, is arranged in the pre-compressor section 2. Furthermore, a second air pressure sensor 9 is arranged in the post-throttle section 7, using which the air pressure in the air mass flow in this section is measurable. The intermediate section 4 is embodied free of air pressure sensors, a measurement of the air pressure in this region is thus not possible using the proposed fresh air feed device, however, knowing the air pressure in operation of the internal combustion engine improves the control quality of the fresh air feed device.

Ascertaining the air pressure in operation of the internal combustion engine, thus when the air mass flow flows through the fresh air feed device, is enabled by the measurement of the air pressure using the second air pressure sensor 9. The pressure drop upon flowing through the throttle valve 6 can be determined for the air mass flow 11 passing through the throttle valve via known physical relationships. Such a calculation of the air pressure in the intermediate region 4 presumes the assumption of at least the size of the area through which the air mass flow 11 passes, the so-called effective area. The effective area is dependent here in particular on the degree of opening of the throttle valve. However, if this assumed effective area does not correspond to the actual area through which the air mass flow 11 passes, the calculated air pressure thus also deviates from the actually prevailing air pressure in the intermediate region 11. A deviation of the areas can result due to unavoidable manufacturing tolerances, however, the actual area can also change during the service life, in particular due to deposits, and therefore a calculation calibrated in the new state can deviate from reality after considerable operating time. To avoid an auxiliary air pressure sensor in the intermediate section, the invention therefore proposes a calibration of the determination of the air pressure in the intermediate region 4 which is repeatable in operation. In a first operating state, for this purpose the air pressure is measured in the air mass flow using the first and the second air pressure sensor 8, 9. The first operating state is selected here so that the air pressure in the air mass flow in the pre-compressor section 2 and in the intermediate section 4 is at least approximately equal or deviates by a known pressure difference. Furthermore, the calculation of the air pressure is then carried out for the intermediate region 4, which originates as described from the air pressure measured using the second air pressure sensor 9, and the air pressure thus ascertained is compared to the air pressure ascertained using the first air pressure sensor 8.

In the event of a deviation in this comparison, the calculation, starting from the air pressure measured using the second air pressure sensor 9, is adapted so that the calculation "matches", in particular the airflow in the throttle valve is changed. In other words, the calculation of the air pressure for the intermediate section 4 is calibrated in this method sequence.

If the internal combustion engine is operated in an operating mode different from the first operating mode, thus in a part-load or full-load operating mode, the calibrated calculation method is then applied to determine the air pressure in the intermediate region 4 on the basis of the air pressure measured using the second air pressure sensor 9 and the air pressure for the intermediate section can thus be determined more accurately in this second operating mode than without calibration.

Figure 2:
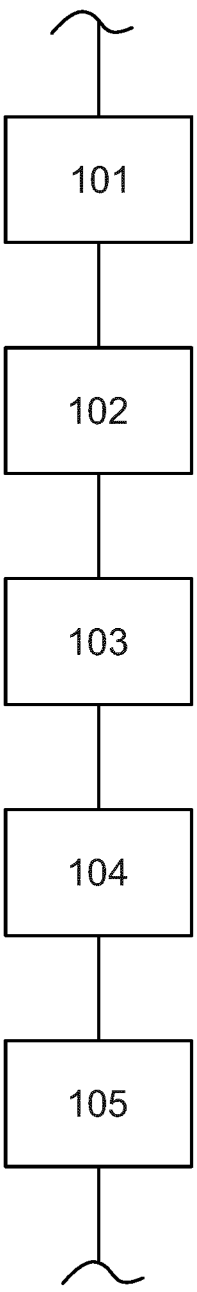
FIG. 2 is a schematic flow chart for the operating method.

FIG. 2 shows a flow chart for the proposed operating method. In step 101, the air pressure in the first operating state is measured in the pre-compressor section using the first air pressure sensor 8. In step 102, the air pressure in the first operating state in the post-throttle section is measured using the second air pressure sensor 9. In step 103, the air pressure measured in step 102 is converted in a throttle equation to that in the intermediate region 4 under the assumptions made, in particular the effective area. The air pressure thus ascertained for the intermediate region is compared in step 104 to the air pressure measured in step 101. If this comparison has the result that the two air pressures deviate from one another by more than a predetermined tolerance, the calculation method is thus adapted for the air pressure measured on the basis of the measurement using the second air pressure sensor 9, in particular the size of the effective area is adapted, in particular the actual area through which flow can occur is thus determined.

Using the adapted calculation method, thus in particular using the calibrated calculation on the basis of the measured value from the second air pressure sensor 9, in step 105, the air pressure is calculated in an operating state deviating from the first operating state.

In other words, the invention is used in an internal combustion engine in reciprocating piston construction, wherein a throttle flap is installed therein in the fresh air feed device. An air pressure sensor is provided downstream of the throttle flap. However, the air pressure in the air mass flow during the operation of the internal combustion engine upstream of the throttle flap is also relevant for the control of the internal combustion engine or the fresh air feed device. In particular to save costs, this air pressure is not measured using an air pressure sensor, but rather calculated with the aid of a generally known throttle equation. In particular the following parameters are entered in this equation:

air pressure downstream of the throttle valve, air temperature upstream of the throttle valve, air mass flow, and the effective area in the throttle valve through which this air mass flow can flow, this is in particular dependent on a throttle flap position of the throttle valve.

The effective area is accordingly only indirectly known, since it is unknown in particular whether the throttle valve clogs with contaminants over time, only the set degree of opening or opening angle is known. If the above-mentioned parameters are known, a calculation of the air pressure in the intermediate region is possible. However, deviations can occur between the air pressure ascertained using the proposed calculation method and that actually prevailing in the intermediate region due to sooting/soiling, in particular at the throttle valve, in particular due to soot deposits and due to component variations because of manufacturing tolerances.

The invention makes use of the principle in an internal combustion engine having an exhaust gas turbocharger such that the air pressure in the intermediate section 4 can be concluded starting from the air pressure measured in the pre-compressor section 2. In the first operating mode, in particular thus in the idle mode of the internal combustion engine, the air pressure is known sufficiently accurately since the compressor device 3 of the exhaust gas turbocharger or the high-pressure stage of the exhaust gas turbocharger hardly builds up charge pressure. An air pressure sensor is provided upstream of this high-pressure stage. The pressure before the throttle flap may be estimated in idle using a simple calculation model. This is not possible in the required accuracy at other operating points of the internal combustion engine. The air pressure in the intermediate region 4 can be determined more accurately with the aid of the calculation method calibrated in idle of the internal combustion engine than without the calibration.

In other words, an area error (presumed or effective area in the throttle valve in relation to the area through which flow can actually occur) is minimized using the calibration. The area through which flow can occur determined in the first operating mode can be stored in a control unit as the calculation basis and used for air pressure determination in all other operating ranges. In particular, the influence of the component tolerances and the unknown sooting/soiling in the fresh air feed device can be taken into consideration by this method. An air pressure sensor upstream of the throttle valve is not necessary, although an accurate air pressure ascertainment is possible.

What is claimed is:

1. A method of operating a fresh air feed device configured to feed fresh air from an environment surrounding an internal combustion engine into at least one combustion chamber of the internal combustion engine, the fresh air feed device including:

a controllable throttle valve configured to change an area through which fresh air flows in the fresh air feed device so as to at least partially block the fresh air feed device, a compressor arranged upstream of the throttle valve in a planned flow-through direction from the environment into the combustion chamber and is configured to convey an air mass flow in the planned flow-through direction in the fresh air feed device, a pre-compressor section upstream of the compressor, an intermediate section downstream of the compressor and upstream of the throttle valve, and a post-throttle section downstream of the throttle valve, the method comprising:

in a first operating state:

measuring a first air pressure using a first air pressure sensor arranged in the pre-compressor section, measuring a second air pressure using a second air pressure sensor arranged in the post-throttle section;

calculating a theoretical air pressure for the intermediate section based on the second air pressure, wherein the theoretical air pressure is a function of a theoretical area through which air flow can occur, comparing the theoretical air pressure to the first air pressure so as to determine whether the theoretical air pressure deviates from the first air pressure; and determining a correction value to the theoretical area upon determining that the theoretical air pressure deviates from the first air pressure beyond an error threshold value.

2. The operating method according to claim 1, further comprising:

in a second operating state:

measuring a third air pressure using the second air pressure sensor, calculating a corrected air pressure for the intermediate region based on the third air pressure and the correction value.

3. A fresh air feed device configured to feed fresh air from an environment surrounding the internal combustion engine into at least one combustion chamber of the internal combustion engine, comprising:

a controllable throttle valve for changing an area through which fresh air flows in the fresh air feed device so as to at least partially block the fresh air feed device;

a compressor arranged upstream of the throttle valve in a planned flow-through direction from the environment into the combustion chamber;

a pre-compressor section upstream of the compressor;

an intermediate section downstream of the compressor and upstream of the throttle valve;

a post-throttle section downstream of the throttle valve;

a first air pressure sensor arranged in the pre-compressor section;

a second air pressure sensor arranged in the post-throttle section; and an engine control unit configured to:

in a first operating state:

measure a first air pressure using the first air pressure sensor, measure a second air pressure using the second air pressure sensor, and calculate a theoretical air pressure for the intermediate section based on the second air pressure, wherein the theoretical air pressure is a function of a theoretical area through which air flow can occur, compare the theoretical air pressure to the first air pressure so as to determine whether the theoretical air pressure deviates from the first air pressure, and determine a correction value to the theoretical area upon determining that the theoretical air pressure deviates from the first air pressure beyond an error threshold value.

4. An internal combustion engine comprising the fresh air feed device according to claim 3.

* * * * *